United States Patent [19]

Walton

[11] Patent Number: 4,459,474

[45] Date of Patent: Jul. 10, 1984

[54] IDENTIFICATION SYSTEM WITH SEPARATION AND DIRECTION CAPABILITY AND IMPROVED NOISE REJECTION

[76] Inventor: Charles A. Walton, 19115 Overlook Rd., Los Gatos, Calif. 95030

[21] Appl. No.: 264,856

[22] Filed: May 18, 1981

[51] Int. Cl.³ ............................................. G06K 5/00
[52] U.S. Cl. ................................... 235/380; 235/487; 235/439; 235/491; 340/825.31; 340/825.36; 340/825.33; 375/91; 360/2
[58] Field of Search ................ 375/91, 66, 62, 81, 375/119; 340/696, 825.31, 825.36, 825.37, 825.34, 825.49; 235/380, 449, 439, 487, 491; 343/763; 455/134; 328/165, 167; 331/2; 360/2

[56] References Cited

U.S. PATENT DOCUMENTS

| | | | |
|---|---|---|---|
| 3,551,889 | 12/1970 | Miller | 340/171 |
| 3,864,633 | 2/1975 | Strenglein | 325/304 |
| 3,908,084 | 9/1975 | Wiley | 178/69.5 R |
| 3,947,769 | 3/1976 | Rousos et al. | 325/320 |
| 4,179,686 | 10/1979 | Bonicalzi | 340/146.3 AG |
| 4,223,830 | 9/1980 | Walton | 235/380 |
| 4,236,068 | 11/1980 | Walton | 235/380 |
| 4,334,221 | 6/1982 | Rosenhagen et al. | 340/825.72 |
| 4,357,707 | 11/1982 | Delury | 375/119 |

OTHER PUBLICATIONS

IBM Tech. Disclosure Bulletin, vol. 21, No. 6, 11/78, pp. 2515-2517.
IBM Tech. Disclosure Bulletin, vol. 13, No. 1, 6/70, pp. 176 & 177.

Primary Examiner—A. D. Pellinen
Assistant Examiner—Robert Lev
Attorney, Agent, or Firm—Gerald L. Moore

[57] ABSTRACT

An electronic identification system having a portable identifier with the ability to transmit by radio or audio signal the contents of an included memory upon interrogation or command to identify the user. The identifier transmits a plurality of radio frequencies intermittently to represent the memory data in digital form. The transmitted data includes a description of the proper bearer of the identifier so that a local check can be made to ascertain that the identifier is being carried by the proper person. The reader system not only identifies the bearer, but also makes a proportional recording of the transmitted data. With dual receivers and dual receiving antennas together with the proportional recording, it is possible to determine the direction of movement of the identifier through a portal into a limited access area. With proportional recording it is also possible to analyze the memory data and separate the signals from several identifiers which may have been transmitted in a time overlapping manner. Noise is cancelled by transmitting two differing radio frequencies and subtracting the signals of the two frequencies and by redundant transmission of the basic information.

6 Claims, 5 Drawing Figures

IDENTIFICATION SYSTEM WITH SEPARATION AND DIRECTION CAPABILITY AND IMPROVED NOISE REJECTION

TECHNICAL FIELD

This invention relates to electronic identification and recognition systems comprising an integrated circuit with a power source preferably formed in a package similar to a credit card and which transmits a radio or phonic signal for identifying the holder.

RELATED PATENTS AND APPLICATIONS

U.S. Pat. No. 4,223,830, Identification System, Issued Sept. 23, 1980, with Charles A. Walton as inventor;

U.S. Pat. No. 4,236,068, Personal Identification and Signaling System, issued Nov. 25, 1980, with Charles A. Walton as inventor;

U.S. patent application Ser. No. 144,901, Personal Identification and Signaling System, filed Apr. 29, 1980, with Charles A. Walton as inventor; and U.S. patent application Ser. No. 221,720, Portable Radio Frequency Emitting Identifier, filed Dec. 31, 1980, with Charles A. Walton as inventor.

BACKGROUND OF THE INVENTION

The present invention relates in general to the same technology as the above-identified patents and patent applications. The above patents and patent applications are incorporated by reference in this application.

As more and more financial and other business transactions take place in offices and stores remote from a central accounting office, there develops a greater need for precise identification of the person involved in the transaction. For instance in the cashing of checks or in the identification of a person to determine whether or not they should be allowed into a restricted area, there is a greater need for unerring identification. Additionally with so many computer files which incorporate personal data concerning individuals, it is further important to assure that this data is not made available to unauthorized persons.

The present invention relates to an identification system which is a modification and improvement over those systems described in the above-identified applications and patents. A problem with earlier systems occurs when several identifier signals are presented to a reader at a timing so close together that the signals overlap thereby making it difficult for the reader to separate the signals. One feature of this invention is to provide improved means for such signal separation.

Another deficiency with earlier identifiers of this general type involves their inability to determine the direction of motion of the identifier, that is, whether there is occurring ingress or egress from a restricted area. It is a further feature of this invention to show means for determining in which direction the identifier is moving.

In earlier systems the identifier could be acquired by an unauthorized person thus allowing fraudulent or misleading transactions to occur because it is difficult at the point of sale or point of entry to detect and prohibit these improper transactions. The present invention incorporates within a memory information allowing verification that the proper person is using the identifier.

Earlier identifiers have also been susceptible to incorrect signal transmissions in the presence of noise which can reverse the nature of a bit in the transmission process, that is, a "one" can appear as a "zero" and vice-versa. The present invention incorporates redundant radio frequencies and a noise rejecting comparison circuit to reduce this risk and provide more reliable and faster signal transmissions.

SUMMARY OF THE INVENTION

An identification system comprising a portable identifier for emitting a radio frequency signal, and a reader for receiving and identifying the signal. The identifier includes a memory which carries numerical and personal identification of the bearer and includes one, two or more radio frequency generators. The reader interrogates the portable identifier and rejects noise from the identifier signal received in the transmission. The reader also includes a permanent proportional memory system which stores the signals and the associated signal levels received. A signal analyzer reads this memory for analysis of the signal received. The reader system may also contain an antenna system positioned or manipulated to allow a determination by the reader of the direction of travel of the identifier. Also disclosed is a method of separating several identifier signals which overlap in time by noting and tracking the phase position of their bit data. Also the data information is transmitted on two radio frequencies with the signals being subtracted to reject noise impulses.

DESCRIPTION OF THE INVENTION

It is anticipated that the subject identification system will be used for conducting financial, business or identification transactions at points remote to a central processor. For instance branch banks can use the identifier supplied by the person who desires to conduct a banking transaction to query the central processor about the identification and financial standing of the person. The identifier can include in the identification signal certain coded information peculiar to the user. This keys in the identification so that the financial information can be gained and read out to verify the transaction. It is also anticipated that the central processor can conduct an inquiry to see if the proper person is carrying the identifier. For instance the computer can transmit back the particular identifying number or code of the user and the intermediary, whether a teller or a machine, can compare this code with information keyed in by the user to determine if the user actually should possess the identifier.

The data included in the memory of the amplifier might include information such as height, weight, color of hair, color of eyes, color of skin, age group and distinguishing characteristics equivalent to the information carried on a driver's license. This information can be displayed at a point of sale and a sales person, or at a point of entry a guard can verify, that the proper person is bearing the identifier. The data may also include a personal identification number known only to the proper user, which number is entered by the user manually or verbally for verification and authorization.

Other applications of such an identification system include security areas wherein the identifier is issued to a person with authorized entry. By use of the identifier the person is recognized by the central processor and is approved for entry or exit. Additionally the central processor can record times of entry and exit based on the code of the identification signal.

The identifier is preferably a portable device which can have many forms but in the preferred embodiment, is in the shape of a credit card. Thus it may be carried in the wallet, pocket or handbag and will radiate a radio-frequency electromagnetic signal modulated by intelligence recorded in the logic circuit memory. The transmission of the signal can be initiated by the reader, can be constant or can be initiated by the user.

Figure 1:
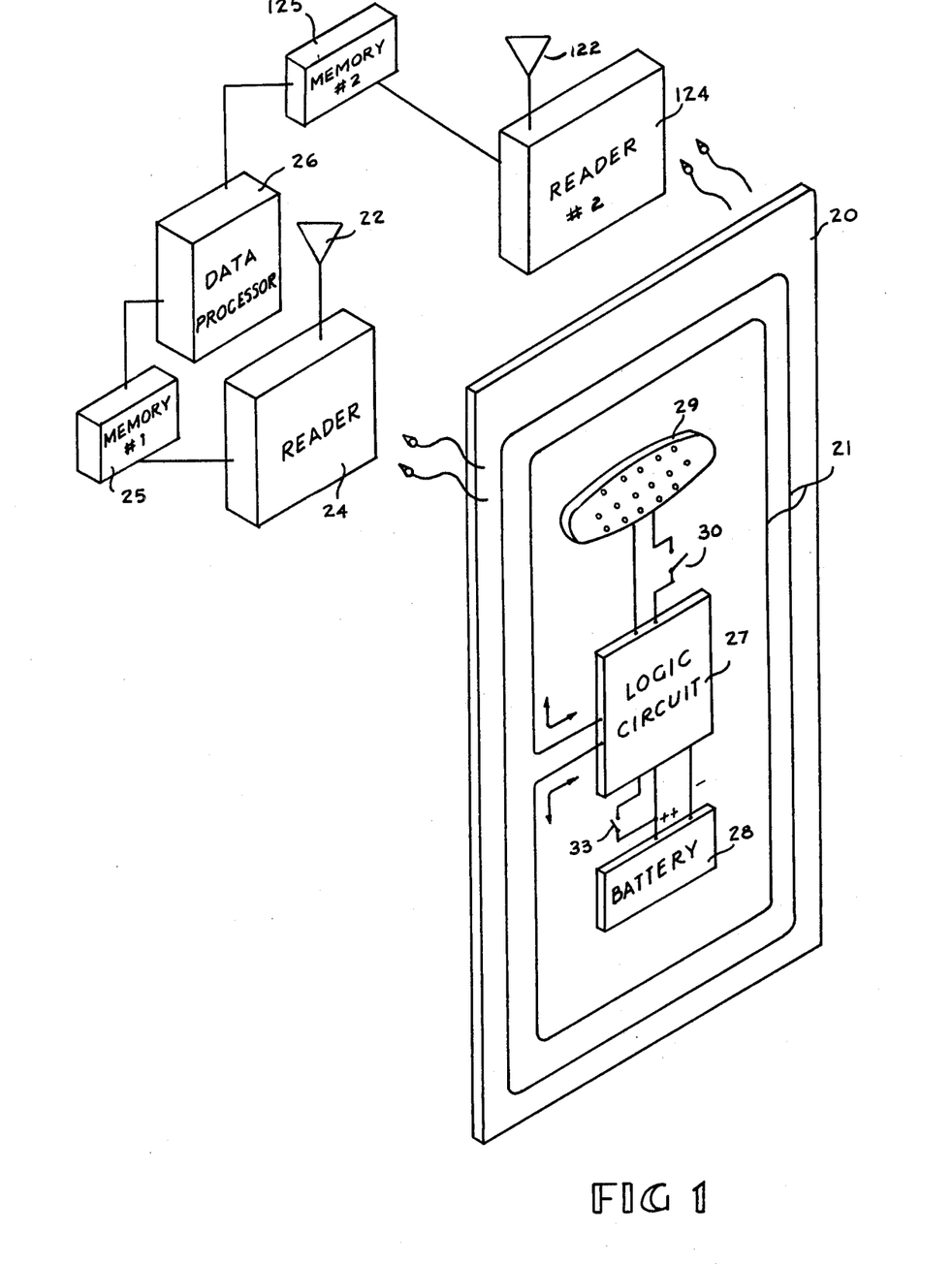
FIG. 1 shows the principal portions of the identifier and reader in a preferred configuration of a credit card size identifier.

The basic components of the invention are shown in FIG. 1 and generally comprise an identifier 20 and a reader system. This identifier is capable of generating and transmitting, by means of the antenna 21, identification signals received at an antenna 22 of the reader 24. These signals in turn are transmitted to a memory 25 and then to a data processor 26 for identification and processing. In some embodiments of the invention it is anticipated that the central processor will send signals back to the reader which in turn are transmitted and recorded in the identifier. Also shown in FIG. 1 is the second reader system, comprising an antenna 122, a reader 124 and a memory 125, the purpose of which will be described later.

The identifier 20 includes a logic circuit 27, which is powered by a battery 28, and an antenna 21. Additionally the identifier can include a speaker 29 for generating audible signals. The audible signals are useful if the identifying signal is to be transmitted through a telephone network. A switch 30 can be actuated to energize the speaker.

To allow transmission to be initiated by the user, a switch 33 is provided which is user actuated. For transmissions initiated by the reader, there is supplied a circuit (to be described later) which causes energization of the logic circuit for transmission of the identification signal.

Figure 2:
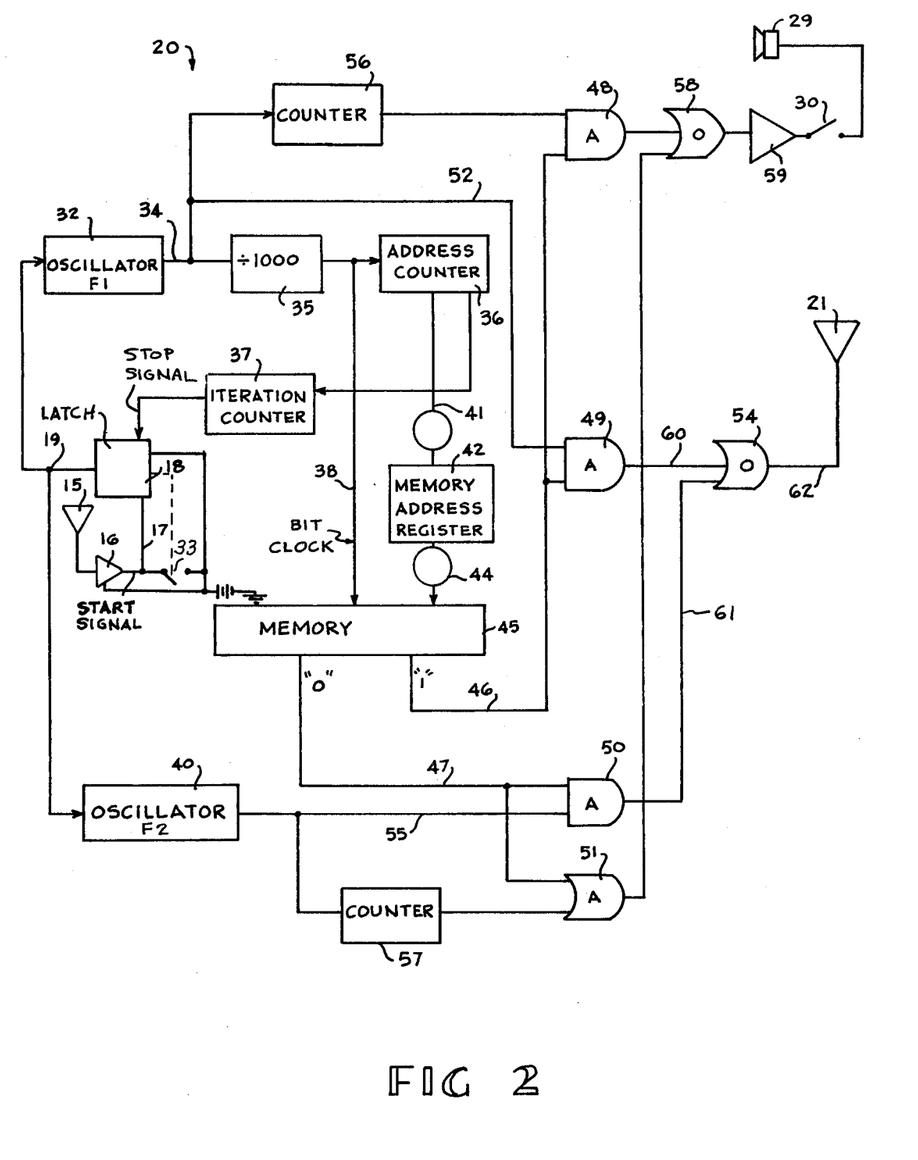
FIG. 2 shows the block diagram and elements of the portable identifier.

In FIG. 2 the logic diagram of the identifier 20 is shown. A start signal from line 17 sets latch 18. The line 17 may be energized by a push button 33 or from an external interrogation signal from antenna 15 and amplifier 16. Typically the antenna 15 is the same as the antenna 21. Operation of the latch 18 applies power on the line 19 to all parts of the circuit by conventional means, not shown. During the standby or nontransmitting mode, power is supplied only to the latch 18 and the amplifier 16.

When power is applied to the circuit the oscillators 32 and 40 oscillate at a frequency high enough to radiate effectively at radio frequencies, yet low enough to operate standard logic circuits. A suitable frequency is 4 megahertz. The output signal of the oscillator 34 is first divided in frequency by the counter 35, with a typical countdown reduction of 1,000. The output of the counter 35 is at a rate suitable for transmitting bits of data, i.e. the "bit rate" or "bit clock" signal appears on line 38. This signal is applied to the address counter 36 which cycles through a count of bits, a typical value of which might be 64, so that all binary values between 0 and 63 are successively held by the counter 36. After each count of 64, there is one output signal from the counter 36 to the iteration counter 37. Typically eight iterations are counted by the counter 37 and at the last iteration, an impulse from the counter 37 stops the transmission and removes power from all parts of the circuit except the latch 18 and the amplifier 16. The system now comes to rest and waits for the next start command. The oscillator 40 operates at a frequency similar to but distinguishable from that of the oscillator 32. Typical frequencies are 3.7 or 4.3 megahertz.

The value in the counter 36 is passed over the group of lines 41 to a memory address register 42. This register in turn addresses, through the group of lines 44, the memory 45. During transmission, the address counter 36 passes through the various count values from 0 to 63 and passes these values over a group of six lines 41 to the memory address register 42. The memory address register briefly holds the address value and addresses the memory 45 over the group of lines 44. The bit clock 38 "strobes" the memory to cause an output. It is realized that the conventional circuits used to avoid temporary "sliver" signals, while not shown, can be incorporated in the circuit in the normal manner.

The memory 45 includes the personal identification number or code of the identifier as well as other information, as desired, such as personal description, bank balance, et cetera. Thus as the counter 36 performs its count, "ones" or "zeros" are emitted from memory 45 to the conductors 46 and 47, respectively, to AND gates 48, 49, 50 and 51. The AND gates 48 and 49 will be half-selected if a "one" is emitted while the AND gates 50 and 51 will be half-selected if a "zero" is emitted. In this manner the output of the oscillator 32, transmitted through the conductor 52, will appear at the line 60 if a "one" is transmitted while the output of the oscillator 40, transmitted through the conductor 55, will appear on line 61 if a "zero" is conducted. The lines 60 and 61 both supply the OR gate 54. The output of the OR gate 54 supplies, over the line 62, these radio frequency signals to the antenna 21.

The identifier can also transmit an audible signal via the speaker 29. For this purpose the counters 56 and 57 reduce the frequency of the signals from the oscillators 32 and 40, respectively, to audio frequency values. With the occurrence of a "one", the AND gate 48 is half selected and the signal from the counter 56 is fed through the OR gate 58, an amplifier 59 and the switch 30 to the speaker 29. Alternatively, with the occurrence of a "zero", the signal from the counter 57 is fed through the AND gate 51 to the OR gate 58 and subsequently transmitted by the speaker 29. The speaker output is energized by the closing of the switch 30. In the manner described there is generated by the identifier 20 a signal which is radiated either by the antenna 21 or the speaker 29. This identification signal is responsive to a series of "ones" and "zeros" previously recorded in the memory 45.

Figure 3:
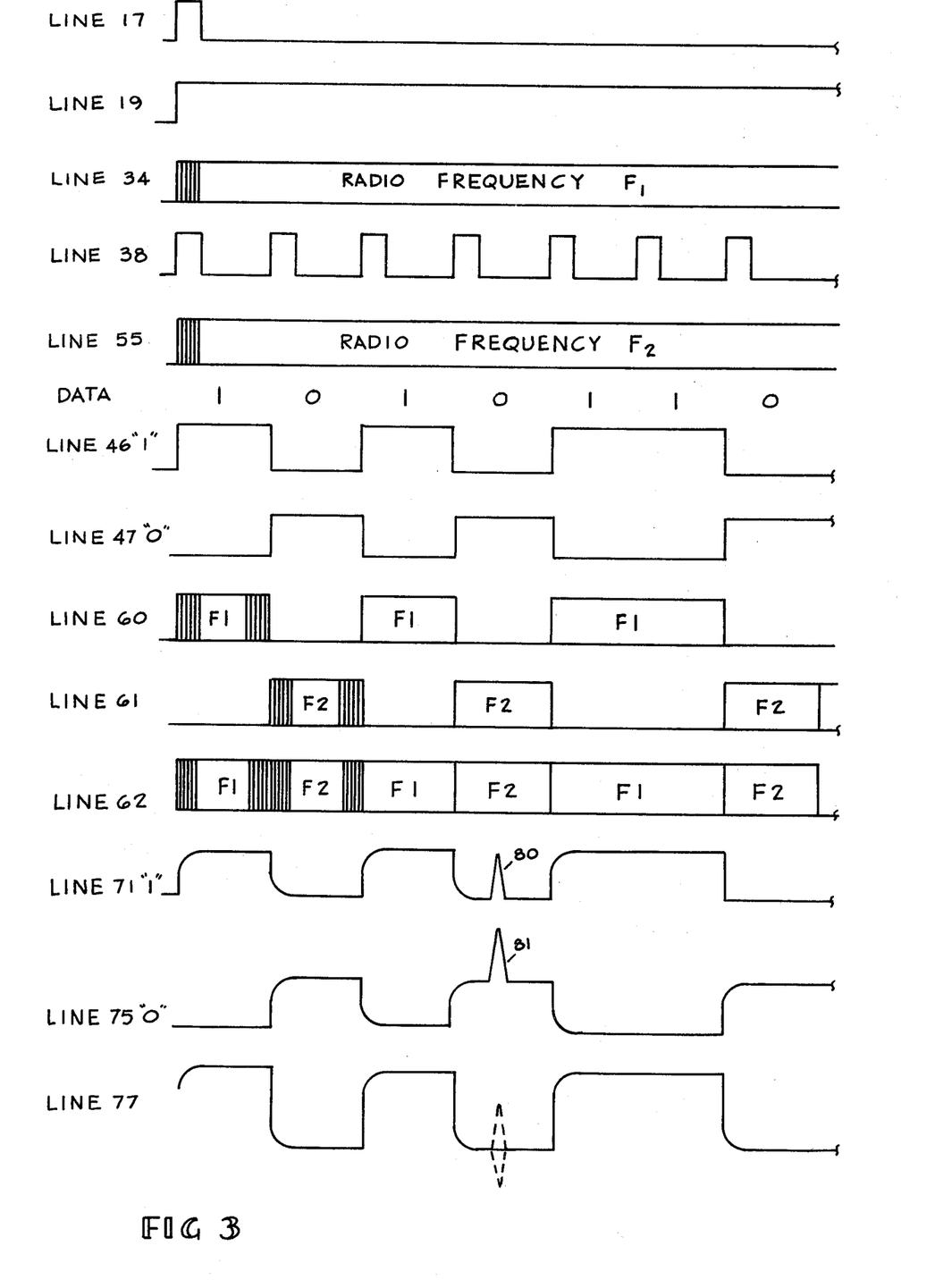
FIG. 3 shows the wave shapes occurring in the identifier and in the reader.

Turning now to FIG. 3, there are shown various wave forms from the circuit of FIG. 2. Line 17 represents a typical start impulse signal. On line 19 is the resulting application of power to the principal portions of the circuit. Line 34 represents the resulting output signal of the oscillator 32. Line 38 shows the bit timing signal after the division of oscillator 34 frequency signal by the counter 35. On line 55 appears the output signal from the oscillator 40. The data line represents the particular data, previously recorded, emitted from the memory 45 with the "ones" and "zeros" being represented on the lines 46 and 47. As a result of the above signals, the lines 60 and 61 carry the pulses of the radio-frequency signals F1 and F2 in response to whether a "one" or a "zero" is transmitted from memory. These signals in turn are transmitted on the line 62 as interspersed pulses of the differing radio frequency signals.

Figure 4:
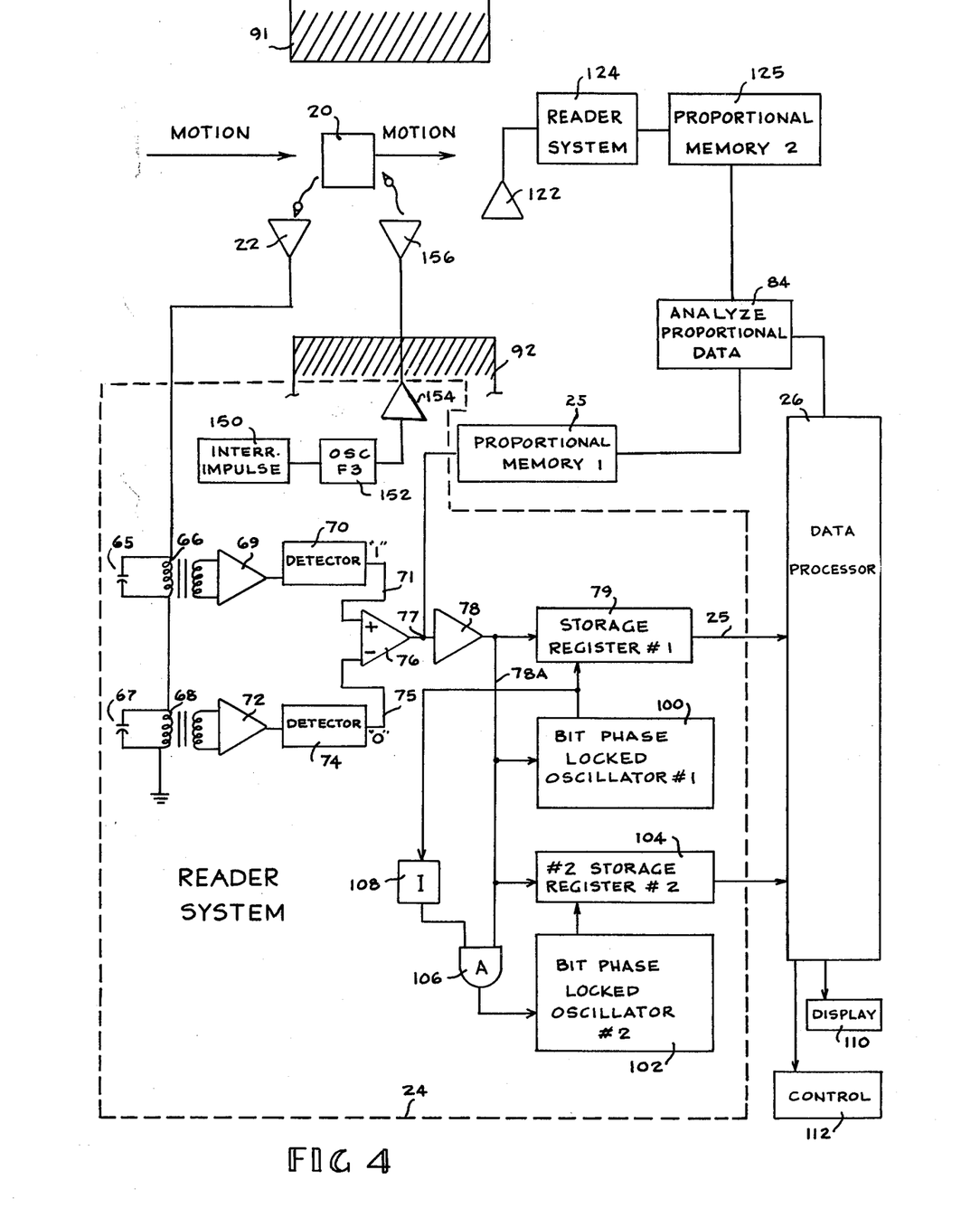
FIG. 4 is the block diagram of the reader system.

In FIG. 4 is a block diagram of the reader 24 shown in FIG. 1. The signal from the identifier is sensed by the antenna 22 and is transmitted to a first resonant circuit formed by a capacitor 65 and a coil 66 and then to a second resonant circuit formed by a capacitor 67 and a coil 68. Such resonant circuits are commonly found in radio receivers. The first resonant circuit is resonant to the frequency F1 and indicates the presence of a "one" after the signal is passed through an amplifier 69 and a detector 70 to emerge in the conductor 71. Similarly a "zero" is indicated by the frequency F2 passing through the amplifier 72 and a detector 74 to a conductor 75. The conductors 71 and 75 supply the positive and negative inputs to the differential amplifier 76. The two inputs are subtracted by the differential amplifier 76. The output of the amplifier 76 appearing on line 77 is within the linear level, also called the proportional or analog level, at which information on the signal level is retained. The signal on line 77 is next amplified by the high gain amplifier 78 from the low level linear signal to logic levels. The amplifier 78 sends the logic levels to the storage register 79 which serially receives and stores the bit data. The output of the amplifier 78 also drives a bit phase-locked oscillator 100 which operates in a manner well-known in the art, to fall into phase with the bit data being received from the identifier 20 through the reader system 24 and provide the clocking data for the storage register 79. The output of the amplifier 76 rises for a "one" and is down for a "zero" as a result of subtracting the complementary signals from the lines 71 and 75. FIG. 3 shows the signals on the lines 71, 75 and 77. The bit data is stored in register 79 and upon command, is transferred over the line 25 to the data processor 26.

Because the differential amplifier 76 subtracts its two input signals, there are rejected certain noise spikes which occur in radio frequency transmission systems, such as the spikes 80 and 81 shown in FIG. 3. By subtracting the two signals, however, no spike appears on the output line 77. Since noise causes both signals to rise in the same direction, the subtraction of the signal cancels out most of these extraneous pulses. The overall effect is to obtain a more reliable data signal and thereby allow data to be transmitted at a higher rate. Another manner of considering the circuits is that both radio frequency channels are transmitting the same data, i.e. either up or down, and such redundancy allows the subtraction or the elimination of noise. With the elimination of the noise the data rate can be more than doubled since less signal redundancy of other types is needed.

Certain difficulties have occurred in the more advanced systems which use this type of identifier. A typical usage is for access control, where a number of individual, each with an identifier, use the same portal. For instance, in a nuclear power plant it is important to know the location of each individual although a number of individual may pass through various portals rapidly and at nearly the same time. As a result, several identifiers may be presented nearly simultaneously, to a single reader and difficulty arises in accurately separating the identifier signals. A second difficulty arises in determining the direction the identifiers pass through the portal.

In FIG. 4 is shown means for eliminating or reducing these two problems. The signal at line 77 is the detected but still raw data signal received from the reader. The amplitude of this signal varies with the closeness or remoteness of the identifier, although some automatic gain control will have been inserted prior to this point. The signal at this point is still in the "linear" or "proportional" form. This signal is fed to the memory 25, which can for instance, be either an audio tape memory or an audio disc file memory, with or without the analog to digital conversion used in the recording process. The important function served is the retention of the signal strength data for later processing. The time of data recording is also included in the recorded data.

With analog data retention in the memory 81, it is possible to replay and repeat the signals an indefinite number of times. With the presentation of a single identifier the data processor can rapidly, positively and uniquely identify the device. When several identifiers are presented such that their signals overlap, several replays of the memory can be utilized to allow close and conditional examination of the data and programmed choices and attempts are made, allowing opportunity to resolve several identifiers after they have passed, even though their signals have overlapped. Means for such resolution is suggested later. The system response will be somewhat slower than direct recognition but, at electronic speeds, will still be satisfactory. As a last resort, after a rushed emergency exit raises doubt about certain individuals having passed through a portal, slow replay of the memory will allow a close examination of the record. Further, the magnetic memory is permanent and can be used for a review of activity many days later and will also serve as a backup in the event that certain equipment, such as printers or digital data transmission equipment, should fail later which otherwise would cause a loss of the record of activity.

FIG. 4 shows an exit portal or pathway 90 between wall segments 91 and 92. At one side of the portal is an antenna 22 previously described. At the other end of the pathway is a second antenna 122 similar to the antenna 22. The antenna 122 connects to a reader system 124 identical in the principle portions to the reader 24 with the data being stored in a tape or disc memory 125 which is identical to the memory 25 of FIG. 1. Thus two records are generated for the passage of each identifier. The two records not only allow increased accuracy and a reduction of errors in resolving overlapping transmissions but also allow for determining the direction of motion of an individual identifier. Such direction is determined by comparing the relative amplitudes of the received signals from the reader system 24 and reader system 124 in an analyzer 84. If the identifier first passes the antenna 22 and then the antenna 122, the amplitude of the signal received from the antenna 22 will reach a peak value earlier than the signal from the antenna 124, and conversely, passage in the other direction will cause a peak signal to first be detected by the antenna 124 and then by the antenna 24. A comparison of the signal amplitudes and times in one of several ways well-known in signal technology allows for determination of the direction of movement. In this manner the signals from the memory 24 and the memory 124 are compared and analyzed in the analyzer 84 for direction determination and for resolution of identification signals when overlap occurs. This analyzer may be part of a dedicated data processor 26 for comparing the signals by reducing the signal levels to digital information. The results of processing the identification data from the identifier are displayed on the display 110. Any appropriate actions, such as opening a door, or sounding an alarm, are effected by the control 112.

Next is described a method for separating transmissions from several identifiers when their signals overlap in time. The method involves first the recording in linear memory of the transmissions from one or both reader antennas, and secondly, the separation of the signals on the basis that their bit phase position will differ. The bit phase position is that of the bit signal or bit clock illustrated on line 38 in FIGS. 2 and 3. This bit phase position is recovered in the reader in the bit phase locked oscillator 100.

For free running identifiers, that is, identifiers which are turned on continuously, there will be random differences in bit phase from the various identifiers. This difference in phase positions will arise naturally due to the identifiers not having been started at the same times and due to their not having exactly the same oscillator frequency. When two signals from identifiers are presented to a reader, this difference can be detected and used to separate the signal, except in the situation of a rare coincidence of the bit phase signals in the two identifiers presented. In this situation, the reader calls for a second reading or otherwise indicates that the two signals were not separated. Similarly in systems where transmission is initiated by pressing a contact, there is only a small risk that two individuals will press their buttons at the same time thereby allowing phase timing to be used to separate the two transmissions.

The alternate method of initiating a signal from the portable identifier is illustrated in FIGS. 4 and 2. Referring to FIG. 4, an interrogation pulse timer 150 periodically emits a pulse and this pulse stimulates oscillator 152, whose signal is amplified by amplifier 154 and radiated by antenna 156. The radio signal is received by antenna 15 of the portable identifier shown in FIG. 2. An advantage of the interrogation pulse system over continuous identifier transmission is an increase in battery life.

Figure 5:
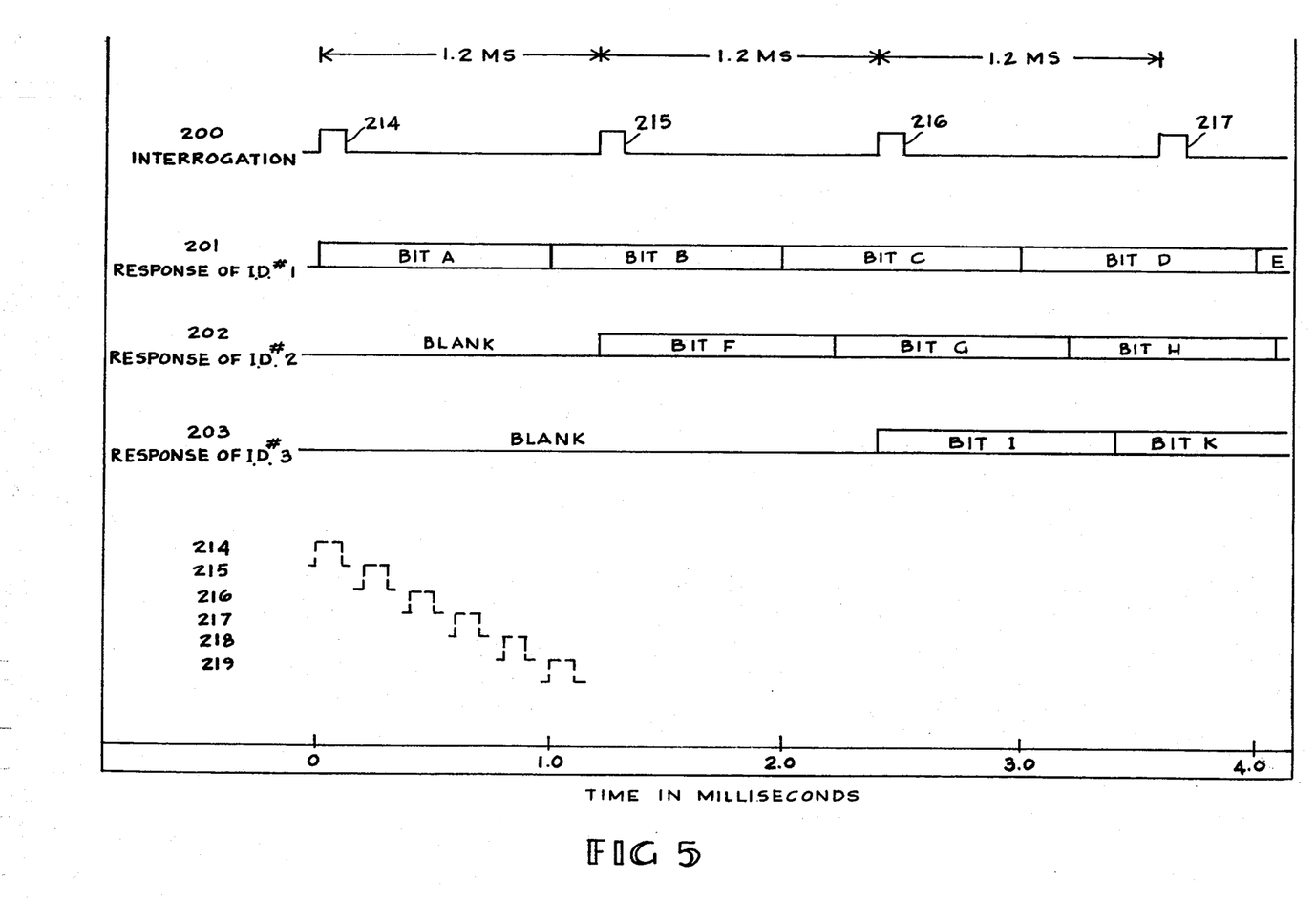
FIG. 5 shows wave shapes occurring during the identification of an identifier signal.

A risk with the interrogation pulse system lies in the fact that when several portable identifiers are in the receiving range of the interrogation pulse, they all will transmit their signals in the same phase position and their bit data will be synchronous thereby making separation of signals from several identifiers difficult. In FIG. 5 therefore, is shown a method of timing the interrogation pulses so that distinction between identifiers is aided rather than hindered. The signal 200 represents the interrogation impulses sent from the readers in the manner previously described. These pulses stimulate the identifier circuit and cause it to emit a string of data equivalent to that shown on lines 46 and 47 of FIG. 3. For purposes of illustration, an example system bit rate of one millisecond per bit has been chosen. The response of the identifier 20 to stimulation by a pulse 214 (FIG. 5) from the reader is shown on line 201. Once stimulated, the data is emitted from the identifier at the bit rate of one bit per millisecond, labeled as bits A, B, C and D, et cetera. The bits may be individual "on" or "off" radio frequency impulses or they may be tones as described in referenced patents.

A second portable identifier identical to the identifier described above, however, can be stimulated by the interrogation pulse 215 on line 200 and start its cycle of transmission not only later but at a time position or phase position of the bit signal which differs from that of the signal from identifier #1. The two overall transmissions may, however, overlap in time since the first identifier may still be transmitting when the second identifier starts.

The reader 24 receives and records the overlapping transmission. The reader contains, however, two or more oscillator systems which oscillate at the bit rate of one bit per millisecond and which include phase detectors which will effect phase lock of the oscillator to the phase position of the bit signal of the identifier. Once locked onto the desired phase, the presence of other signals with a differing bit phase will not cause unlock. An oscillator once locked on will see only the signal to which it is locked. Thus if locked on identifier #1, signals from identifier #2 will not disturb the data transmission accuracy since the signals from identifier #2 will have a different phase and the transition edges will differ in timing from the transition edges of the signal from identifier #1. A dual mode phase locked oscillator, as described later, aids this function.

Signals from the second identifier will pass through the linear portions of the reader 24. At the output of the amplifier 78 on line 78A, the various input signals will appear and will synchronize bit phase locked oscillator 100 as described. The input signals can similarly synchronize bit phase locked #2 oscillator 102 provided the signals pass through the AND gate 106. Note that AND gate 106 passes all signals except those at the same timing of bit phase locked oscillator #1, since the inverter 108 provides a negative function. Therefore bit phase locked oscillator #2 will lock on signals other than those synchronizing phase locked oscillator #1 and phase locked oscillator #2 will track the second identifier. Both phase locked oscillators will cause the appropriate data to be shifted into their associated storage registers 79 and 104. The data is temporarily stored and then moved into data processor 26 for processing. The processing includes functions such as evaluating multiple readings for accuracy and noise rejection and examination of memory for appropriate responses to particular identifiers.

Thus as individual identifiers approach and pass the read station, they are stimulated by interrogation impulses which differ in bit phase position and the responding transmissions differ in phase by the same amount. The identifier signals have thus been individually "tagged" or "marked" to allow the individual separation and identification. This incremental advance of the timing position of the interrogation impulse is also referred to as "precession" of the phase position of the impulse.

For the example time scale and positions shown, there are five possible bit phase positions for the interrogation impulses. These phase positions are shown in the group marked 214 to 221 (FIG. 5). Note that position 219 has the same phase position as 214 and is therefore not a separate position. The quantity of phase positions emitted in this example is five.

The phase locked oscillators used for locking onto the several bit phase positions will be of the dual mode type in which there is an original broad range "capture" mode for original synchronization, followed by a narrow range "hold" mode for remaining locked onto the bit phase and rejecting bit signals outside of the expected "hold" window. Further, of the several phase locked oscillators provided, there will be a cross-connection so that only one phase locked oscillator is locked to any particular phase and the other phase locked oscillators will search for any other phase signal which may enter the system. The radio frequency value used for interrogation will be of a different value from the radio frequencies used for data transmission from the identifier so identifiers do not stimulate one another's transmission.

DESCRIPTION OF VARIATIONS OF THE SYSTEM

Variations and evolutions of the art and technology of identification evolve and devolve from the preceding description. Some of these evolutions come from the introduction of several radio frequency carriers, rather than one, and some from the introduction of a proportional memory prior to data processing. These variations include:

1. Rather than two radio frequencies, there may be four or eight transmitting couplets or triplets of data. Certain radio frequencies may be dedicated to starting, stopping and bit synchronizing;
2. The oscillator in the identifier may be noncrystal controlled but close to the correct frequency and synchronized by a radio signal from the reader;
3. Various tone modulations may be applied to the various radio frequencies for redundancy in identification and for aid in separating identifiers which transmit at overlapping times;
4. The portable device can be arranged to receive new data as well as transmit, allowing change in its internal memory stored values;
5. A display can be provided on the identifier to report the activity and internal memory status and display also the status of the battery voltage;
6. Contacts on the device can allow recharge of the battery or of transmission of data in a wired manner so that undesired readers do not receive the transmission;
7. The identifier may respond or "beep" to show that it has been interrogated and/or to show that a transmission has been satisfactorily completed;
8. When using multiple radio frequencies the receiver of the system can be relatively simple if given the capability of scanning through and stopping at a variety of radio frequencies;
9. A single rotating antenna can be used and a record made of the rotary position together with an amplitude record. The directional nature of the antenna allows deduction of the direction of motion of the identifier;
10. The equivalent of a rotating antenna described above can be achieved with a multiple element phase gated antenna array; and
11. In the event that several identifiers transmit their data almost simultaneously, that is one starts a transmission before the other is completed, with a simple receiver system the intermixing of the data would be impossible to unscramble. Such overlapping transmissions can be separated, however, with more sophisticated techniques. In one way the signal strength differences can be used, since successive bits from one identifier at one distance will have approximately the same signal strength, whereas successive bits from another identifier at another distance will have another value of signal strength. A portion of the receiver circuits would "lock on" to a particular signal strength from a particular identifier, even though this strength would gradually vary with position, and thus isolate a particular identifier signal. Another similar circuit in the receiver would "lock on" to a second differing signal strength from the second identifier. If signal strengths crossed one another of course, or if there were three or more identifiers, momentary losses of signal could occur and smarter signal processing and data analysis from the linear record would be needed to bring out the identification from the differing identifiers. Tracking by signal strength in this manner is partially analogous to the cellular system now likely to be adopted for Advanced Mobile Phone Service or AMPS.

In a second way described in more detail in FIG. 5 and the specification, the bit phase position of the data can "tag" an identifier. Various identifiers, if allowed to free run with their own oscillator control, will acquire differing bit phase positions and a sophisticated receiver system can have several phase locked bit oscillators (redundant block 100's of FIG. 4) which will isolate identifier signals by their bit phase position. If the oscillators of the identifiers are not free running but are synchronized and initiated by an interrogation pulse from the reader, they can be assigned differing bit phase positions by causing the interrogation impulse to precess in time in a manner which is not in step with the bit rate so that differing identifiers will respond with differing bit phase positions.

In a third way, identifiers will be able to "hear" or receive in a simple way from neighboring identifiers and will automatically switch to a differing bit phase position or switch to a differing impulse time slot or cell and thus avoid overlaying their data upon one another. The identifiers can intersperse their transmissions in a consistent way, so that although the total message overlaps the individual parts can be distinguished by the receiver part of the reader and reassembled to recover the desired message.

A combination of the preceding will provide yet more reliability and more capability for separation.

ADVANTAGES

The advantages of transmitting data in this manner, using radio frequencies rather than inserting the portable device into a reader, are:

1. There are no metallic contacts or connections to wear or get dirty. The system is all solid state;
2. There are no sockets or slots subject to damage or vandalizing and no pins which might be bent due to forcing or incorrect installation;
3. There are no exposed voltages;
4. There is no need for a mechanism being needed to grasp and move the portable device such as for systems which move a credit card past a magnetic strip reader;
5. There are no precise positioning requirements. It is not necessary to get "this side up" and "this edge forward" or place the device precisely in a slot or hole;
6. There may be intervening material (non-metallic) while reading, so that the device may be left in a wallet, handbag, sleeve or jacket, or the device may be merely hanging from an object to be identified;
7. The reader/receiver may be buried in a protective housing or in a wall and yet the data is transmitted accurately.

The advantages of this invention over the referenced patents are:

1. The use of several radio frequencies improves the rate of data transfer and reduces the effects of noise interference;
2. The tape or disc memory allows review of the transmissions and activity data at any later time and reconstruction of the activity data if any recording or output device has failed;

3. The multiple antennas plus the proportional memory allow analysis of the data for direction of motion and also increase the ability to separate identifiers with overlapping signals; and 4. The stimulation of transmission at several phase positions of the bit signal allows separation of transmission from several identifiers even though their signals overlap in time.

I claim:

1. An electronic identification and memory data transmission system, comprising:
   a portable identifying device bearing electronically stored identification and other data;
   one or more radio frequency oscillators for generating radio frequency output signals;
   a logic circuit to read the stored data;
   modulation means acting responsive to said stored data to modulate the said oscillators output signals;
   an antenna to radiate the said modulated signals;
   a reader to receive and store the said radiated signals at analog levels proportional in nature to the signal levels received;
   a data processor to process said proportional stored signals; and
   each reader including two or more reading systems, each with a proportional memory system and a data processor adapted to read and compare all the radiated signals.

2. An electronic identification and memory data transmission system as defined in claim 1 in which the reader includes two or more antennas placed in the direction of movement of the bearer of the portable identifying device;
   said reader records the rise and fall of the signal strength as the bearer passes the said several antennas; and
   said data processor includes means to compare the amplitudes of the received signals to determine the direction of motion of the bearer.

3. An electronic identification and memory data transmission system as defined in claim 1 in which the data processor being programmed to determine by amplitude and by phasing tests the difference between two identifier output signals and to emit identification data responsive to the two or more identifier signals.

4. An electronic identification and memory data transmission system as defined in claim 3 in which the reader includes means to emit interrogation impulses; and
   said portable identifying device includes means acting responsive to receipt of said interrogation pulses to cause the output signals to be radiated.

5. An electronic identification and memory data transmission system as defined in claim 4 in which the portable identifying device includes means to emit responses at various bit timings responsive to when the interrogation pulse stimulated a response from the identifying device, and in which the data processor of the reader system includes means to recognize these differing timings to distinguish among transmissions from several portable identifying devices.

6. An electronic identification and memory data transmission system, comprising:
   a portable identifying device bearing electronically stored identification and other data;
   one or more radio frequency oscillators for generating radio frequency output signals;
   a logic circuit to read the stored data;
   modulation means acting responsive to said stored data to modulate the said oscillators output signals;
   an antenna to radiate the said modulated signals;
   a reader to receive and store the said radiated signals at analog levels proportional in nature to the signal levels received;
   a data processor to process said proportional stored signals;
   said reader including a receiving antenna which has greater reception ability in some directions than others and which continuously rotates in multiple directions;
   said reader stores information indicating the direction of rotation of the said antenna; and
   said data processor includes a data analyzer which analyzes this direction in conjunction with signal strength to determine the direction of motion of the said portable identifying device and its bearer.

* * * * *